(12) United States Patent
Chi et al.

(10) Patent No.: US 10,541,826 B2
(45) Date of Patent: Jan. 21, 2020

(54) COMMUNICATIONS CONTROL METHOD, COMMUNICATIONS TERMINAL, AND STORAGE MEDIUM

(71) Applicant: Tencent Technology (Shenzhen) Company Limited, Shenzhen (CN)

(72) Inventors: Xingde Chi, Shenzhen (CN); Lu Wang, Shenzhen (CN); Xiao Yuan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 13 days.

(21) Appl. No.: 15/709,322

(22) Filed: Sep. 19, 2017

(65) Prior Publication Data

US 2018/0006836 A1 Jan. 4, 2018

Related U.S. Application Data

(63) Continuation-in-part of application No. PCT/CN2016/086009, filed on Jun. 16, 2016.

(30) Foreign Application Priority Data

Sep. 29, 2015 (CN) .......................... 2015 1 0633410

(51) Int. Cl.
*H04L 12/18* (2006.01)
*H04L 12/58* (2006.01)
(Continued)

(52) U.S. Cl.
CPC .......... *H04L 12/1822* (2013.01); *H04L 51/04* (2013.01); *G06F 3/0482* (2013.01);
(Continued)

(58) Field of Classification Search
CPC ..... H04L 12/1822; H04L 51/04; H04L 51/06; G06Q 550/01; G06Q 10/107; H04M 1/7255; H04M 12/1822; G06F 3/0482
See application file for complete search history.

(56) References Cited

U.S. PATENT DOCUMENTS

| | | | |
|---|---|---|---|
| 6,772,195 B1 * | 8/2004 | Hatlelid | G06F 3/04815 345/419 |
| 2009/0106670 A1 * | 4/2009 | Berndt | H04L 12/1822 715/757 |
| 2014/0115059 A1 * | 4/2014 | Van Wie | H04W 4/21 709/204 |

FOREIGN PATENT DOCUMENTS

| | | |
|---|---|---|
| CN | 1842003 A | 10/2006 |
| CN | 103372318 A | 10/2013 |

(Continued)

OTHER PUBLICATIONS

Tencent Technology, ISR WO, PCT/CN2016/086009, Aug. 26, 2016, 8 pgs.

(Continued)

*Primary Examiner* — Quoc A Tran
(74) *Attorney, Agent, or Firm* — Morgan, Lewis & Bockius LLP

(57) ABSTRACT

This application discloses a communications control method and a communications terminal, so as to implement a change between a point-to-point chat and a group chat among multiple persons, and a user may set a chat identity of the user by using a character. The communications control method provided in this application includes: controlling, by a communications terminal, a first character to move on a character layer, and displaying, on a communications display interface of the communications terminal, different characters on the character layer with the movement of the first character, the first character being displayed on the (Continued)

communications display interface of the communications terminal, the character layer including: the first character and at least one character other than the first character, and the first character being a user object that represents a user when the user chats using the communications terminal; obtaining, by the communications terminal, chat content entered by the user into the communications terminal; and displaying, by the communications terminal, the chat content on the communications display interface as an identity of the first character.

20 Claims, 6 Drawing Sheets

(51) Int. Cl.
    *G06Q 10/10*         (2012.01)
    *H04M 1/725*       (2006.01)
    *G06F 3/0482*       (2013.01)
    *G06F 3/0484*       (2013.01)
    *G06F 17/00*        (2019.01)

(52) U.S. Cl.
    CPC .................... *G06F 3/04845* (2013.01); *G06F 2203/04806* (2013.01); *G06Q 10/107* (2013.01); *H04L 51/06* (2013.01); *H04M 1/7255* (2013.01)

(56) References Cited

FOREIGN PATENT DOCUMENTS

| | | |
|---|---|---|
| CN | 103785170 A | 5/2014 |
| CN | 104104585 A | 10/2014 |
| CN | 104915838 A | 9/2015 |

OTHER PUBLICATIONS

Tencent Technology, IPRP, PCT/CN2016/086009, Apr. 3, 2018, 7 pgs.

\* cited by examiner

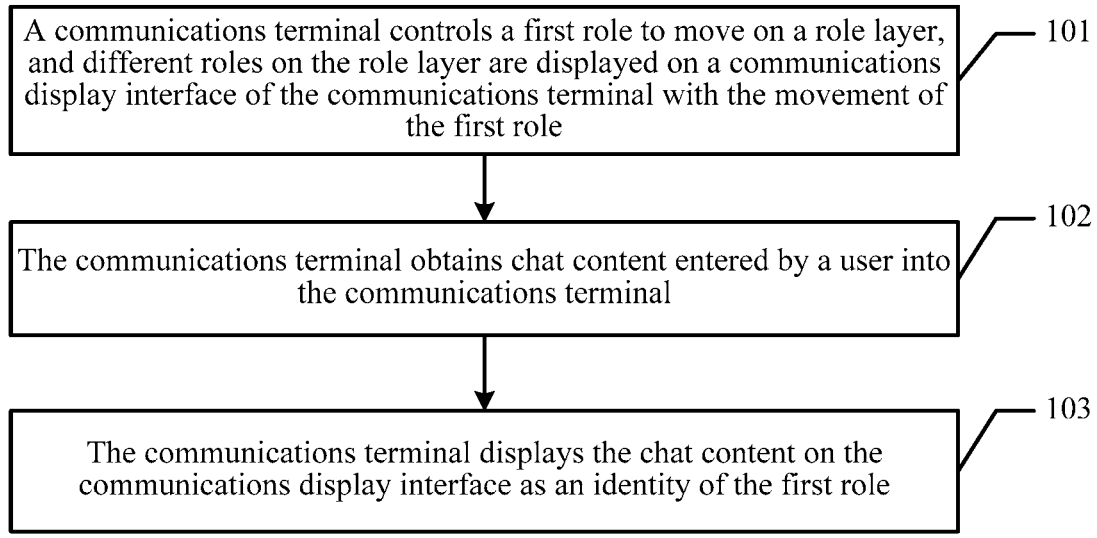
FIG. 1
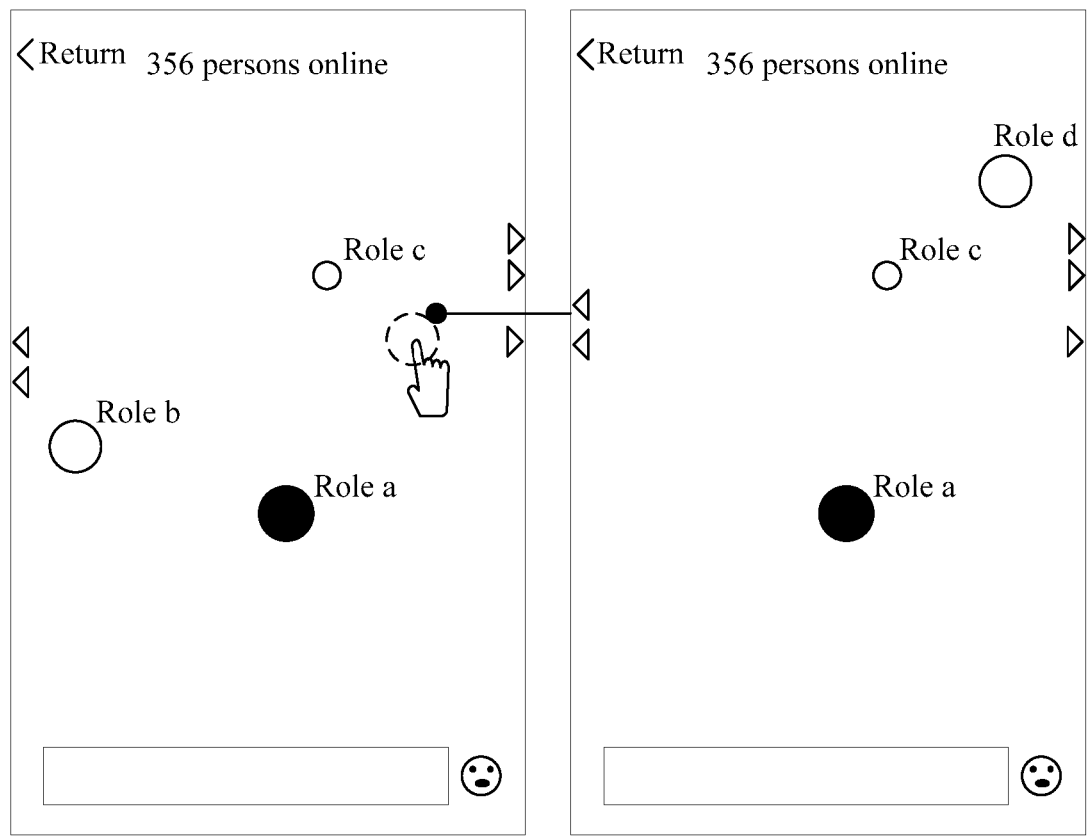
FIG. 2-a

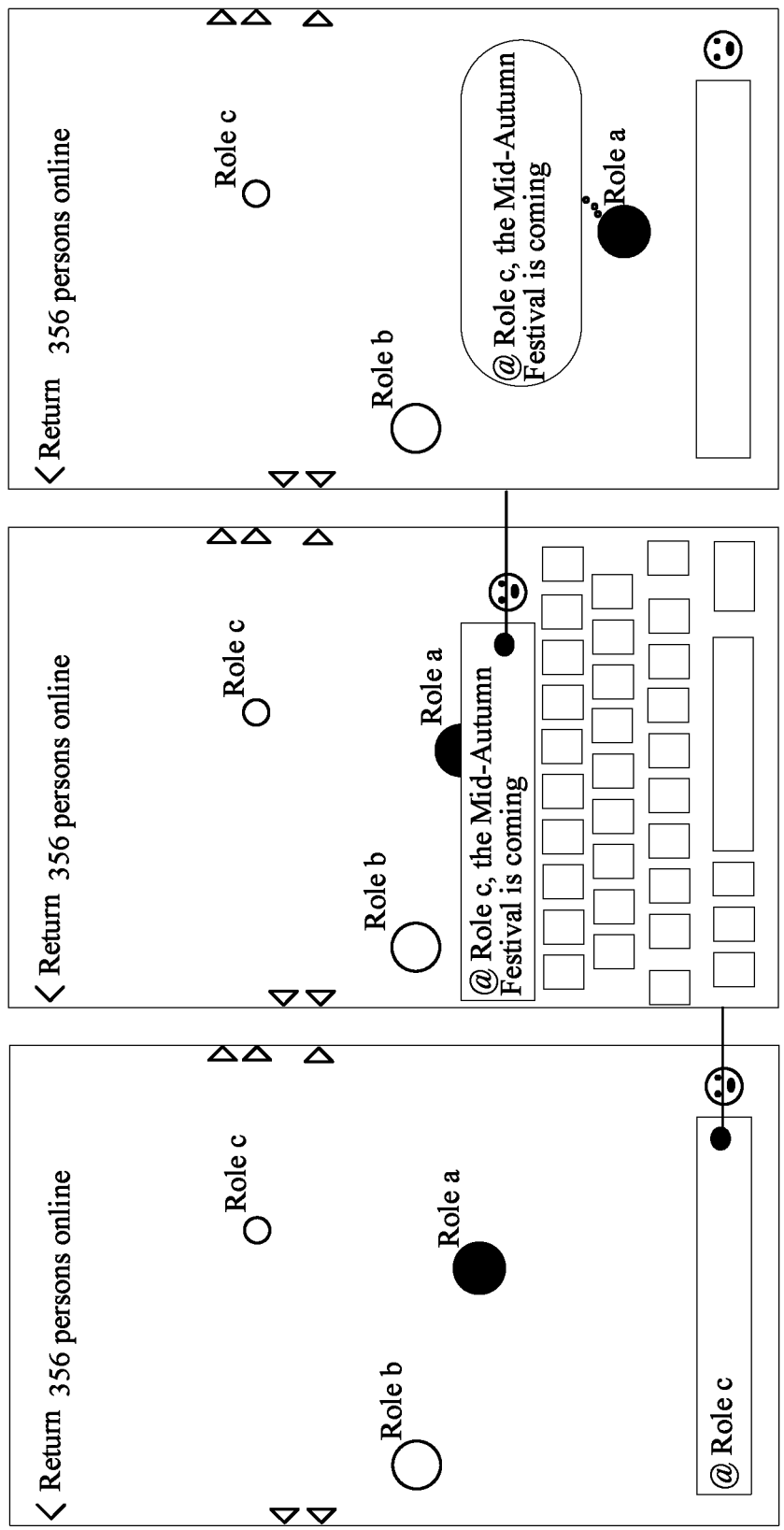
FIG. 2-b

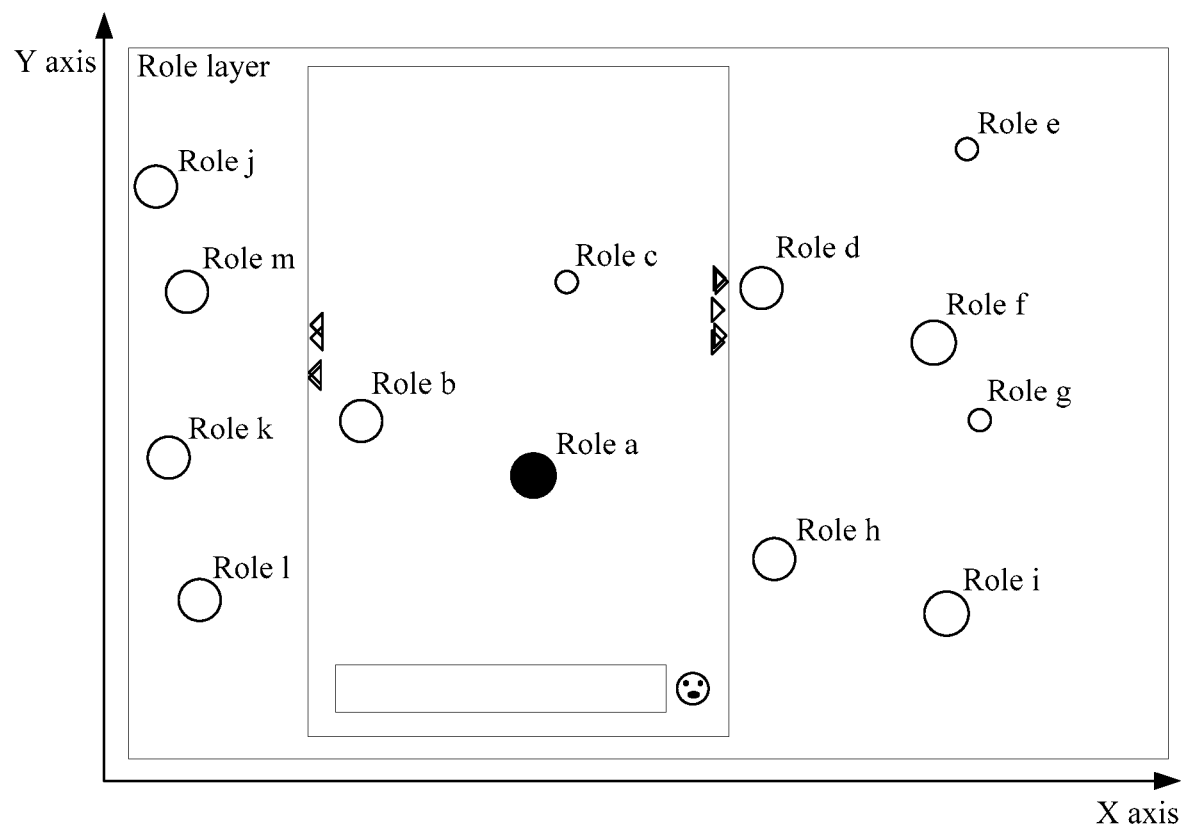
FIG. 2-c

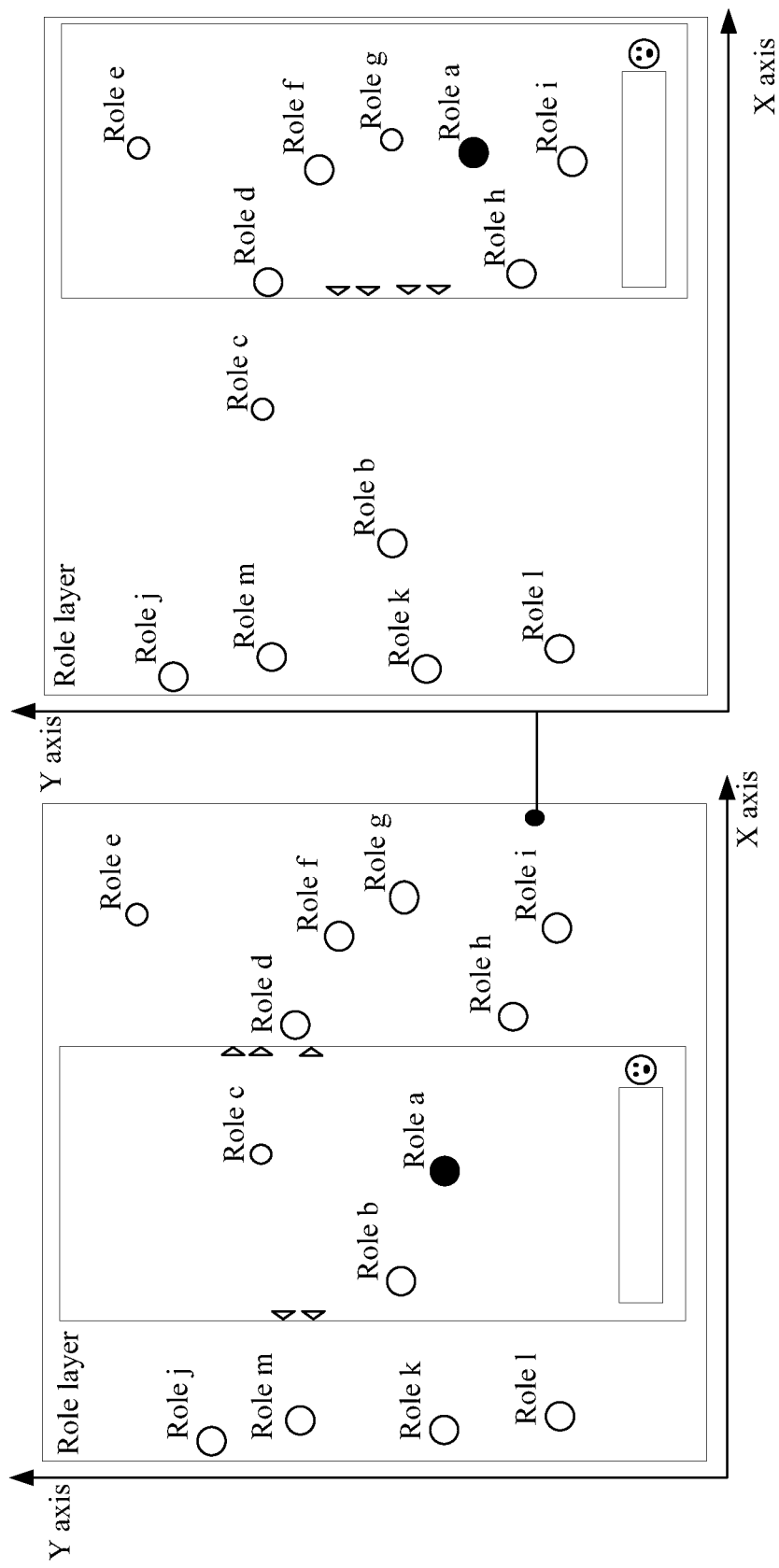
FIG. 2-d

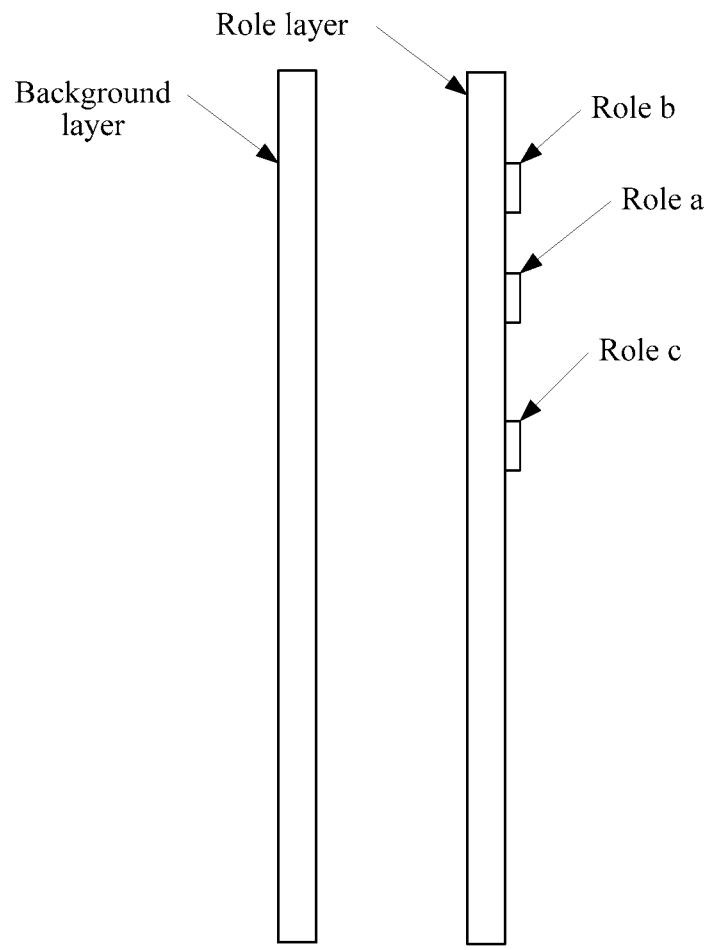
FIG. 2-e
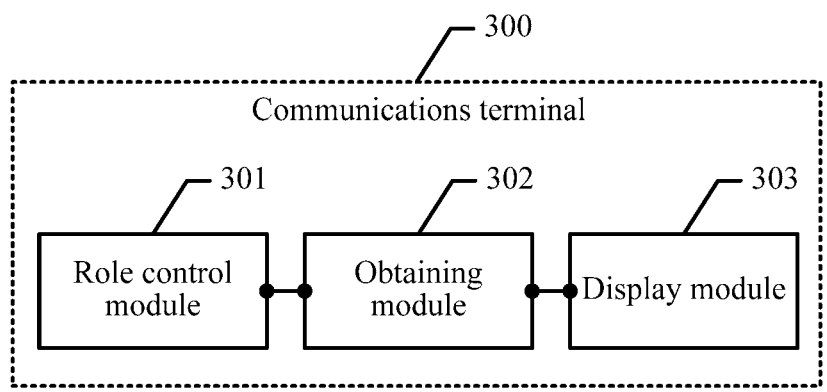
FIG. 3

US 10,541,826 B2

COMMUNICATIONS CONTROL METHOD, COMMUNICATIONS TERMINAL, AND STORAGE MEDIUM

RELATED APPLICATIONS

This application is a continuation-in-part application of PCT/CN2016/086009, entitled "COMMUNICATION CONTROL METHOD, COMMUNICATION TERMINAL, AND DATA STORAGE MEDIUM" filed on Jun. 16, 2016, which claims priority to Chinese Patent Application No. 201510633410.4, filed with the State Intellectual Property Office of the People's Republic of China on Sep. 29, 2015, and entitled "COMMUNICATIONS CONTROL METHOD AND COMMUNICATIONS TERMINAL", both of which are incorporated herein by reference in their entirety.

FIELD OF THE TECHNOLOGY

This application relates to the field of communications technologies, and in particular, to a communications control method, a communications terminal, and a storage medium.

BACKGROUND OF THE DISCLOSURE

In daily life, people have been used to implement real-time communication by means of communications technologies. More and more communications tools may be used to conveniently implement real-time communication between users, and an instant messaging tool is a common communications tool used by people.

In an instant chatting tool, there are mainly two chat manners as follows:

One manner is a point-to-point chat between two persons. Generally, a chat window of two persons is displayed, and chat content is displayed by using the chat window. If a user needs to end a current chat and selects another chat object, the user usually clicks to close a current chat window first, and then open a new chat window.

Another manner is a group chat among multiple persons. Generally, all members in a group are displayed on a right sidebar of a chat window, and all chat content is displayed on a left sidebar of the chat window. Because all the members in the same group can browse all the chat content in the chat window of the group, for each user in the group, a chat within the group cannot be targeted to a particular chat object or some chat objects. If a user in the group needs to select one or more users other than some users in the group, generally, the user needs to create a new group or establish a temporary discussion group first, adds objects that the user wants to chat with into the new group or the temporary discussion group, and then chats with the one or more objects that the user wants to chat with.

In the foregoing chat manners, in the manner of a point-to-point chat between two persons, the user needs to end a chat window first and then opens a new chat window, that is, two operations are required. As a result, it is inconvenient to operate. In the manner of a group chat among multiple persons, the user needs to select one or more objects that the user needs to chat with into a new group or a temporary discussion group first, that is, multiple operations are required. As a result, it is inconvenient to operate. In addition, the manner of a point-to-point chat and the manner of a group chat among multiple persons performed by the user are totally different chat manners. The user can chat by selecting only one manner. The two manners have no relationship, so that the user cannot change the chat manner at any time. In addition, in the foregoing chat manners, the user can chat by using only an identity set by the user. For two parties or multiple parties in the chat, the user cannot change the identity of the user during the chat.

SUMMARY

Embodiments of this application provide a communications control method and a communications terminal, so as to implement a change between a point-to-point chat and a group chat among multiple persons, and a user may set a chat identity of the user by using a character.

The embodiments of this application disclose the following solutions:

According to a first aspect, an embodiment of this application provides a communications control method performed at a first communications terminal having one or more processors and memory storing one or more programs to be executed by the one or more processors, wherein the first communications terminal is one of a group of communications terminals communicatively coupled to one another in support of a group chat among users of the group of communications terminals, the method comprising:

displaying a graphical user interface corresponding to the group chat, the graphical user interface including a first set of characters, each character representing a user of a respective communications terminal;

detecting a first message from a user of the first communications terminal through the graphical user interface;

in response to the first message, transmitting the first message to a first subset of the group of communications terminals corresponding to the first set of characters;

detecting a user instruction to update the graphical user interface;

in response to the user instruction to update the graphical user interface, replacing the first set of characters with a second set of characters, wherein there is at least one difference between the first set of characters and the second set of characters;

detecting a second message from the user of the first communications terminal through the graphical user interface; and in response to the second message, transmitting the second message to a second subset of the group of communications terminals corresponding to the second set of characters.

According to a second aspect, an embodiment of this application provides a first communications terminal that is configured to perform the aforementioned communications control method, the first communications terminal being one of a group of communications terminals communicatively coupled to one another in support of a group chat among users of the group of communications terminals.

According to a third aspect, an embodiment of this application provides a non-transitory computer readable storage medium storing one or more computer programs that, when executed by one or more processors of a first communications terminal that is one of a group of communications terminals communicatively coupled to one another in support of a group chat among users of the group of communications terminals, cause the first communications terminal to perform the foregoing communications control method.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and persons skilled in the art may still derive other drawings from these accompanying drawings.

FIG. 1 is a schematic flowchart of a communications control method according to some embodiments of this application;

FIG. 2-a is a schematic diagram of an implementation manner of controlling, by a user by using a communications terminal, a first character to move according to some embodiments of this application;

FIG. 2-b is a schematic diagram of an implementation manner of controlling, by a user by using a communications terminal, a first character to communicate according to some embodiments of this application;

FIG. 2-c is a schematic diagram of a relationship between a character a and a character layer according to some embodiments of this application;

FIG. 2-d is a schematic diagram of an implementation manner of moving a character a on a character layer according to some embodiments of this application;

FIG. 2-e is a schematic diagram of an implementation manner of a background layer and a character layer according to some embodiments of this application;

FIG. 3 is a schematic structural diagram of a communications terminal according to some embodiments of this application.

DESCRIPTION OF EMBODIMENTS

Figure 4:
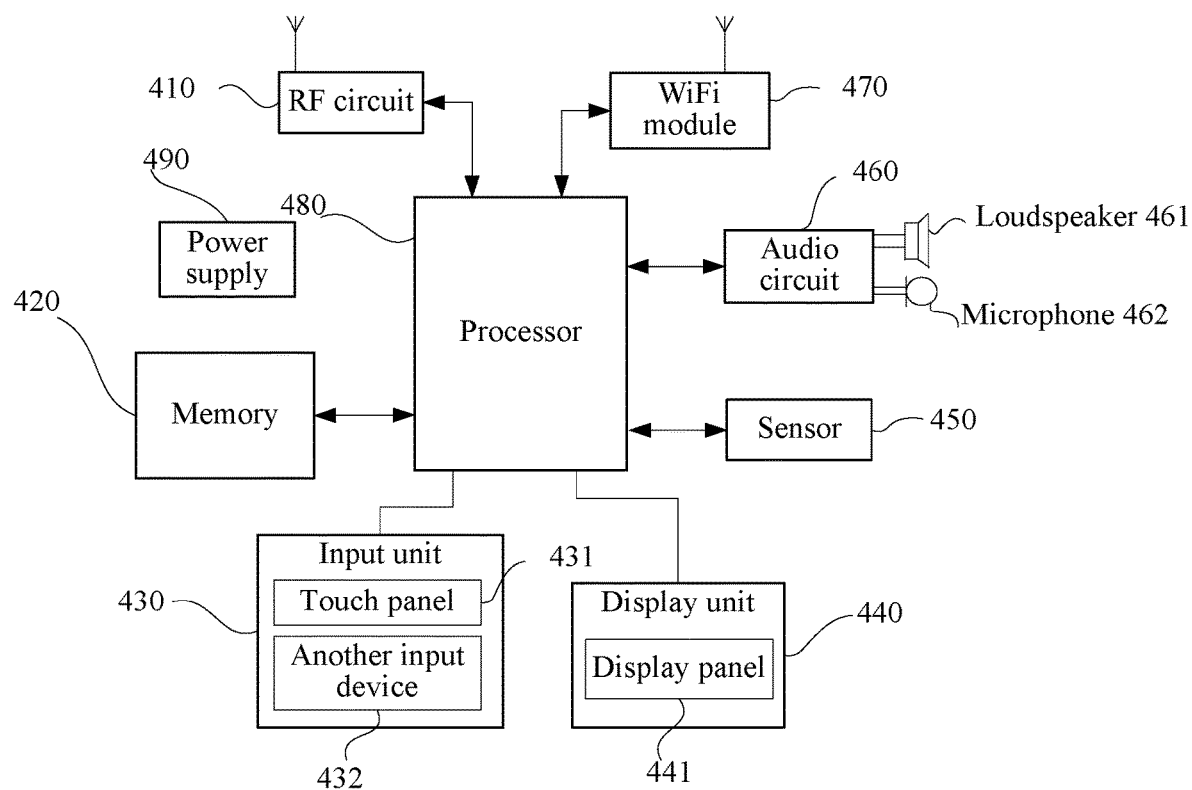
FIG. 4 is a schematic structural diagram of a communications terminal for implementing a communications control method according to some embodiments of this application.

Embodiments of this application provide a communications control method and a communications terminal, so as to implement a change between a point-to-point chat and a group chat among multiple persons, and a user may set a chat identity of the user by using a character.

To make the objectives, features, and advantages of this application clearer and more comprehensible, the following clearly and completely describes the technical solutions in the embodiments of this application with reference to the accompanying drawings in the embodiments of this application. Apparently, the described embodiments in the following description are merely some of the embodiments of this application rather than all of the embodiments. All other embodiments obtained by persons skilled in the art based on the embodiments of this application shall fall within the protection scope of this application.

In the specification, claims, and accompanying drawings of this application, the terms "first", "second", "third", "fourth", and the like (if existing) are intended to distinguish between similar objects rather than describe a specific sequence or a precedence order. It should be understood that the data termed in such a way are interchangeable in proper circumstances, so that the embodiments described herein can be implemented in other orders than the order illustrated or described herein. Moreover, in the specification, claims, and accompanying drawings, the terms "include", "contain" and any other variants mean to cover a non-exclusive inclusion. Therefore, in the context of a process, method, system, product, or device that includes a series of units, process, method, system, product, or device not only includes such units, but also includes other units not specified expressly, or may include inherent units of the process, method, product, or device.

The following provides detailed descriptions.

FIG. 1 shows a communications control method performed at a first communications terminal having one or more processors and memory storing one or more programs to be executed by the one or more processors, wherein the first communications terminal is one of a group of communications terminals communicatively coupled to one another in support of a group chat among users of the group of communications terminals according to some embodiments of this application, and the method may be applied to control a chat process. The communications control method may include operations 101 to 103.

101: A communications terminal controls a first character or a first role to move on a character layer, and different characters on the character layer are displayed on a communications display interface of the communications terminal with the movement of the first character. Note that the terms like "character" and "role" are used interchangeably in this application, both referring to an icon appearing in a graphical user interface that represents a user of a communications terminal that logs into a correspond user account of an instant messaging application or a social networking application supporting the group chat.

The first character is displayed on the communications display interface of the communications terminal. The character layer includes: the first character and at least one character other than the first character. The first character is a user object that represents a user when the user chats using the communications terminal.

In some embodiments of this application, a user chats by operating a communications terminal. The communications terminal includes a communications display interface. A character controlled by the user by using the communications terminal is displayed on the communications display interface, and the user may control the communications terminal to control the character representing the user. In some embodiments of this application, each user controls a communications terminal, each user sets a character in the communications terminal for communication, and characters controlled by all users are included on a character layer, so that in this embodiment of this application, the character layer includes multiple characters, and each character corresponds to a user. By using an example in which the character layer has totally four characters, and the four characters are respectively a character a, a character b, a character c, and a character d. Each character is controlled by a user by operating a communications terminal. For example, the character a is controlled by a user a by operating a communications terminal a, the character b is controlled by a user b by operating a communications terminal b, the character c is controlled by a user c by operating a communications terminal c, and the character d is controlled by the user d by operating a communications terminal d.

It should be noted that, controlling performed by the user on the character by using the communications terminal may include: controlling the character to move on the character layer, controlling the character to publish chat content, and the like. The communications terminal controls the character to be movable on the character layer, so that the character is displayed on the communications display interface. In some embodiments of this application, the communications control method provided in this application is described by using an example in which the character controlled by the user by using the communications terminal is a first character. Specifically, the communications terminal controls the first character to move on the character layer, and the first character is displayed on the communications display interface of the communications terminal, so that the user may see the first character by using the communications display interface of the communications terminal, and the user controls, by using the communications terminal, to move the first character on the character layer. For example, the user may instruct the first character to move to a location by clicking the location on the communications display interface, the communications terminal detects, by using the communications display interface, a displacement instruction delivered by the user, and after the communications terminal obtains coordinates of the location instructed by the user, the communications terminal may control the first character to move to the coordinates of the location instructed by the user. Alternatively, the user may select the first character by using the communications display interface, and then the user drags the first character to coordinates of a specified location. After the communications terminal detects that the user selects the first character, the communications terminal controls the first character to move on the character layer until the first character moves to the coordinates of the location specified by the user.

In some embodiments of this application, the first character is moved on the character layer under control of the communications terminal, and the character layer includes characters that are respectively controlled by multiple users. With the movement of the first character, characters on the character layer that are displayed on the communications display interface changes. For example, with continuous movement of the first character, coordinates of a location of the first character on the character layer continuously change. Therefore, a location relationship between the first character and another character on the character layer also changes continuously, resulting in the following cases: a character may disappear from the communications display interface of the communications terminal, or a character may be displayed on the communications display interface of the communications terminal. Therefore, with the movement of the first character on the character layer, characters displayed on the communications display interface also change continuously. Therefore, in this embodiment of this application, characters displayed on the communications display interface are changed because the communications terminal controls the first character to move on the character layer, so that the user may select for chatting, by using the first character, one or more characters displayed on the communications display interface after the first character is moved. Therefore, in this embodiment of this application, the user may change a chat object at any time by moving the first character. If after the first character is moved, only the first character and another character are displayed on the communications display interface, the user may implement a point-to-point chat. If after the first character is moved, multiple characters are displayed on the communications display interface, the user may implement a group chat among multiple persons. Therefore, in this embodiment of this application, a change between a point-to-point chat and a group chat among multiple persons may be implemented at any time.

In addition, in this embodiment of this application, the first character is the user object that represents the user when the user chats using the communications terminal. The first character is moved on the character layer and represents a user identity of the user. Therefore, in this embodiment of this application, the user may chat by controlling the first character instead of using a known identity of the user. Because the first character is only a character controlled by the user by using the communications terminal, the user can change a chat identity of the user by changing and resetting the character. In some embodiments of this application, the user controls, by using the communications terminal, the first character to represent the user to chat, so that the user may set a chat identity of the user by using a character. Comparing with the existing technology in which a user cannot change an identity of the user during a chat, in this embodiment of this application, the user chats by using a character, so that the user may change a chat identity of the user at any time, thereby increasing enjoyment during the chat. An example is used below to describe that the user may set an identity of the first character by using the communications terminal. For example, the user may set the first character controlled by the user to a fish in an ocean, or a plant in a desert, or a lion on a grassland, or an alien out in space. By setting the first character, the user may chat with another user by using the first character set by the user. Each user sets a character to represent a chat identity of the user according to a hobby of the user, thereby increasing enjoyment during a chat in this embodiment of this application.

In some embodiments of this application, operation 101 of the controlling, by a communications terminal, a first character to move on a character layer, and displaying the first character on a communications display interface of the communications terminal specifically includes operation A1.

A1: The communications terminal controls the first character to move on the character layer and a background layer, where the first character, and a background image that is on the background layer and that is displayed on the communications display interface are displayed on the communications display interface of the communications terminal.

That is, in some embodiments of this application, not only the foregoing character layer is set, but also the background layer is set. The background layer includes a background image. When the communications terminal controls the first character to move on the character layer and the background layer, characters that are on the character layer and that are displayed on communications display interface change, and the background image that is on the background layer and that is displayed on the communications display interface may also change. The background layer refers to an image used to set off a character. For example, the background layer may be a background image whose color and decorations can be set. When a character representing a user on the background layer, the background layer may set off the character, so that in this embodiment of this application, the user has better experience when chatting by controlling a character by using the communications terminal.

It should be noted that in the foregoing embodiment of this application, the background layer may be used as a background image that sets off each character on the character layer. Settings of the background layer may be set by a developer of the chat tool. The background layer may have no relationship with the character on the character layer, that is, the background layer may be independently set. In addition, in some embodiments of this application, there may further be an implementation manner between the background layer and the character: the character on the character layer and the background image on the background layer have an association relationship, that is, a specific manner of setting the background image on the background layer according to the character on the character layer. The association relationship between the character and the background layer is described below by using an example. For example, if the user sets the first character controlled by the user to a fish in an ocean, the character layer has fishes representing all users, and the background layer may be set to the ocean suitable for the fish to live in. For another example, if the user sets the first character controlled by the user to a plant in a desert, the character layer has plants (such as cacti) representing all users, and the background layer may be set to the desert in which the plant lives. For another example, if the user sets the first character controlled by the user to an animal (such as a lion) on a grassland, the character layer has animals representing all users, and the background layer may be set to the grassland on which the animal lives. Each user may set a character representing a chat identity of the user according to a hobby of the user, and set the background layer according to the association relationship between the character and the background layer, thereby increasing enjoyment during a chat process in this embodiment of this application.

102. The communications terminal obtains chat content entered by a user into the communications terminal.

In some embodiments of this application, it may be learned from the foregoing operation 101 that the communications terminal controls the first character to move on the character layer, the character layer includes multiple characters, and the movement of the first character changes a location relationship between the first character and another character on the character layer. Because the communications display interface of the communications terminal is of a fixed size, only a character whose location relationship with the first character satisfies a particular size requirement is displayed on the communications display interface. With the movement of the first character, a character disappears because a location distance between the character and the first character exceeds a maximum distance requirement of the communications display interface. With the movement of the first character, a character is displayed on the communications display interface because a location distance between the character and the first character becomes shorter. Therefore, in this embodiment of this application, the movement of the first character may change characters displayed on the communications display interface, so that the first character may chat with the character that is already displayed on the communications display interface. It should be noted that in this embodiment of this application, with the movement of the first character, a case in which after the first character moves, only the first character is displayed on the communications display interface may occur. In this case, the first character may continue to be moved to search for another character to chat with; or the first character may be stopped moving, and only the first character is displayed on the communications display interface.

In some embodiments of this application, when the communications terminal controls the first character to move, the user may see, by using the communications display interface, the first character displayed on the communications display interface, and the user may control the first character to chat. Specifically, the user may enter chat content by using the communications display interface, and the communications terminal performs operation 102, so that the communications terminal may obtain the chat content entered by the user into the communications terminal. For example, during the movement of the first character, the first character and other characters are displayed on the communications display interface. In this case, if the user wants to perform a group chat by using the first character, the user may enter chat content into the communications terminal. For example, the user enters chat content: Good morning everyone, happy Mid-Autumn Festival. For another example, during the movement of the first character, the first character and other characters are displayed on the communications display interface. In this case, if the user wants to chat with a particular character (such as a character xx) by using the first character, the user may enter chat content into the communications terminal. For example, the user enters chat content: @ character xx, happy Mid-Autumn Festival. After the user enters the chat content into the communications terminal, the communications terminal may obtain, by using the communications display interface, the chat content entered by the user.

103: The communications terminal displays the chat content on the communications display interface as an identity of the first character.

In some embodiments of this application, after performing the foregoing operation 102, the communications terminal may obtain the chat content entered by the user, and then the communications terminal performs operation 103, so that the communications terminal displays the chat content on the communications display interface as the identity of the first character. For example, a chat input box is displayed, on the communications display interface, around a location in which the first character is located. The chat content that is entered by the user and that is obtained by the communications terminal is displayed on the chat input box. For example, during the movement of the first character, the first character and other characters are displayed on the communications display interface. In this case, if the user wants to perform a group chat by using the first character, the user may enter chat content into the communications terminal, so that all characters displayed on the communications display interface may see the group chat content published by the user by using the first character. For another example, during the movement of the first character, the first character and other characters are displayed on the communications display interface. In this case, if the user wants to chat with a particular character (such as a character xx) by using the first character, the user may enter chat content into the communications terminal, so that the communications terminal may display, to the character xx by using the communications display interface, the chat content entered by the user.

It may be learned from the foregoing content describing this embodiment of this application, a communications terminal controls a first character to move on a character layer, the first character is displayed on a communications display interface of the communications terminal, and with the movement of the first character, characters that are on the character layer and that are displayed on the communications display interface change. The character layer includes: the first character and at least one character other than the first character, and the first character is a user object that represents a user when the user chats using the communications terminal. The communications terminal obtains chat content entered by the user into the communications terminal, and the communications terminal displays the chat content on the communications display interface as an identity of the first character. In some embodiments of this application, the communications terminal used by the user controls the first character representing the user, and the first character is moved on the character layer under control of the communications terminal, so that with the movement of the first character, the characters that are on the character layer and that are displayed on the communications display interface change. Therefore, as the communications terminal controls the first character to continuously move, different characters are displayed on the communications display interface, and all characters displayed on the communications display interface see the foregoing chat content of the user that is displayed on the communications display interface as the identity of the first character. Therefore, the user may change a chat object by moving the first character at any time, and if after the first character is moved, only the first character and another character are displayed on the communications display interface, the user may implement a point-to-point chat. If after the first character is moved, multiple characters are displayed on the communications display interface, the user may implement a group chat among multiple persons. Therefore, in this embodiment of this application, a change between a point-to-point chat and a group chat among multiple persons may be implemented at any time. In addition, in this embodiment of this application, the user controls, by using the communications terminal, the first character to represent the user to chat. Therefore, the user may set a chat identity of the user by using a character.

In some embodiments of this application, after operation 101 of the controlling, by a communications terminal, a first character to move on a character layer, the communications control method provided in this embodiment of this application may further include operation B1 and operation B2.

B1: When the first character stays on the communications display interface after being stopped moving, the communications terminal obtains the first character, and multiple characters other than the first character on the character layer that are displayed on the communications display interface.

B2: The communications terminal displays the first character, and the multiple characters other than the first character on the character layer to the user by using the communications display interface.

In some embodiments of this application, the communications terminal controls the first character to move on the character layer. It may be learned from the foregoing content that, with the movement of the first character, characters that are on the character layer and that are displayed on the communications display interface change. In operation B1, when the first character stays on the communications display interface after being stopped moving, the communications terminal obtains the first character, and multiple characters other than the first character on the character layer that are displayed on the communications display interface, that is, after the first character is moved on the character layer, characters displayed on the communications display interface change, the first character and the multiple characters other than the first character on the character layer are displayed, and the communications terminal obtains all characters displayed on the communications display interface. Then the communications terminal performs operation B2, that is, the communications terminal displays the first character, the multiple characters other than the first character on the character layer to the user by using the communications display interface, so that the user can see the first character controlled by the user, and the multiple characters on the character layer by using the communications display interface when operating the communications terminal. Therefore, the user selects any character from all the characters displayed on the communications display interface to chat with (that is, a point-to-point chat between the first character and a particular character may be implemented), or the user selects all characters from all the characters displayed on the communications display interface to chat with (that is, a group chat among the first character and all the characters on the communications display interface is implemented).

In some embodiments of this application, in an implementation scenario of performing the foregoing operation B1 and operation B2, the foregoing operation 102 of the obtaining, by the communications terminal, chat content entered by a user into the communications terminal may specifically include operation C1.

C1: After the displaying, by the communications terminal, the first character, and the multiple characters other than the first character on the character layer to the user by using the communications display interface, the communications terminal obtains a second character selected by the user from the multiple characters other than the first character on the character layer as a chat object, and obtains chat content that is related to the second character and that is entered by the user into the communications terminal.

That is, in an implementation scenario of performing operation B2, the user determines, by using the communications display interface, the first character, and the multiple characters other than the first character on the character layer that are displayed on the communications display interface. If the user selects a character (for example, the selected character is a second character) from the multiple characters other than the first character on the character layer as a chat object, the user may enter chat content related to the second character. For example, if the user enters the following chat content into the communications terminal: @ second character, happy Mid-Autumn Festival, the communications terminal may obtain the chat content that is related to the second character and that is entered by the user.

Further, in this embodiment of this application, in an implementation scenario in which operation 102 is specifically the foregoing operation C1, operation 103 of the displaying, by the communications terminal, the chat content on the communications display interface as an identity of the first character may specifically include operation D1.

D1: The communications terminal displays the chat content related to the second character on the communications display interface as the identity of the first character.

That is, in this embodiment of this application, if the user enters the chat content related to the second character, when the communications terminal performs the operation of displaying the chat content, the communications terminal displays the chat content related to the second character on the communications display interface as the identity of the first character. For example, if the user enters the following chat content into the communications terminal: @ second character, happy Mid-Autumn Festival, the communications terminal may display the following chat content on the communications display interface as the identity of the first character: @ second character, happy Mid-Autumn Festival.

In some embodiments of this application, after operation 101 of the controlling, by a communications terminal, a first character to move on a character layer, the communications control method provided in this embodiment of this application may further include operation E1 to operation E3.

E1: The communications terminal displays, to the user by using the communications display interface, chat content output by a third character.

E2: The communications terminal obtains chat content that is related to the third character and that is entered by the user into the communications terminal.

E3: The communications terminal displays the chat content related to the third character on the communications display interface as the identity of the first character.

In the foregoing embodiment of this application, a description is made to an implementation scenario in which the communications terminal controls the first character and performs communication using the identity of the first character. In an implementation scenario of operation E1 to operation E3 in this application, it may be learned from the foregoing content that, with the movement of the first character on the character layer, characters that are on the character layer and are displayed on the communications display interface change. If after the first character is moved, the third character is displayed on the communications display interface of the first character, and after the communications terminal that controls the third character displays the first character by using the communications display interface of the communications terminal that controls the first character, the communications terminal that controls the third character publishes chat content as an identity of the third character, the communications terminal that controls the first character may display, by using the communications display interface of the communications terminal that controls the first character, the chat content output by the third character. If the user needs to reply after the user sees the chat content output by the third character, the communications terminal that controls the first character may obtain the chat content that is related to the third character and that is entered by the user, and then the communications terminal displays the chat content related to the third character on the communications display interface as the identity of the first character. It should be noted that in the foregoing embodiment, the third character may be a character on the character layer that is controlled by another user. With the movement of the first character on the character layer, if a location distance between the first character and the third character becomes shorter, the third character is displayed on the communications display interface of the communications terminal that controls the first character. In addition, during the movement of the first character, the third character may also be moved on the character layer, so that with the movement of the third character on the character layer, if the location distance between the first character and the third character becomes shorter, the third character is displayed on the communications display interface of the communications terminal that controls the first character. In the implementation scenario of operation E1 to operation E3, with the movement of the first character on the character layer, the user may select to chat with the third character, and the user may also reply the chat content published by the third character, so that the user may select a chat object at any time by using the identity of the first character.

In some embodiments of this application, before operation 103 of the displaying, by the communications terminal, the chat content on the communications display interface as an identity of the first character, the communications control method provided in this embodiment of this application may further include operation F1.

F1: The communications terminal controls the first character to continue to move on the character layer.

In an implementation scenario of performing operation F1, operation 103 of the displaying, by the communications terminal, the chat content on the communications display interface as an identity of the first character may specifically include operation G1.

G1: When the character is being moved, the communications terminal displays, the chat content on the communications display interface as the identity of the moving first character.

The movement of the first character on the character layer may be a continuous process, that is, before operation 103 and after the obtaining, by the communications terminal, chat content entered by a user, if the first character is stilled being moved on the character layer, operation 103 may be specifically described as that: the communications terminal displays the chat content on the communications display interface as the identity of the moving first character, that is, the communications terminal controls the first character to publish chat content when the first character is being moved. By continuous moving the first character, the user may select a character displayed on the communications display interface to chat with, thereby achieving a function that the user may change a chat object at any time by moving the first character.

It may be learned from a description that is of the foregoing embodiments and that is for this embodiment of this application, a communications terminal controls a first character to move on a character layer, the first character is displayed on a communications display interface of the communications terminal, and with the movement of the first character, characters that are on the character layer and that are displayed on the communications display interface change. The character layer includes: the first character and at least one character other than the first character, and the first character is a user object that represents a user when the user chats using the communications terminal. The communications terminal obtains chat content entered by the user into the communications terminal, and the communications terminal displays the chat content on the communications display interface as an identity of the first character. In some embodiments of this application, the communications terminal used by the user controls the first character representing the user, and the first character is moved on the character layer under control of the communications terminal, so that with the movement of the first character, the characters that are on the character layer and that are displayed on the communications display interface change. Therefore, as the communications terminal controls the first character to continuously move, different characters are displayed on the communications display interface, and all characters displayed on the communications display interface see the foregoing chat content of the user that is displayed on the communications display interface as the identity of the first character. Therefore, the user may change a chat object by moving the first character at any time, and if after the first character is moved, only the first character and another character are displayed on the communications display interface, the user may implement a point-to-point chat. If after the first character is moved, multiple characters are displayed on the communications display interface, the user may implement a group chat among multiple persons. Therefore, in this embodiment of this application, a change between a point-to-point chat and a group chat among multiple persons may be implemented at any time. In addition, in this embodiment of this application, the user controls, by using the communications terminal, the first character to represent the user to chat. Therefore, the user may set a chat identity of the user by using a character.

For better understanding and implementation of the foregoing solutions of this embodiment of this application, the following makes a specific description by using a corresponding application scenario as an example.

This embodiment of this application is described by using an example in which a mobile phone communications terminal chats by controlling movement of a character. The communications terminal has a communications display interface, and the communications display interface is a scenario-based chat interface. A user has a character of the user in a scenario. The user may perform an operation of entering chat content by using an input box by controlling movement of the character by clicking a screen. The communications display interface includes basic design factors: a character on a character layer and a dialog box. In addition, the communications display interface further includes design factors: a background image on a background layer and a style of the character. The style of the character may refer to an identity representing the character, or an external image of the character that is displayed on the communications display interface, such as a character image and a size of the character image.

As shown in FIG. 2-a, FIG. 2-a is a schematic diagram of an implementation manner of controlling, by a user by using a communications terminal, a first character to move according to some embodiments of this application. FIG. 2-a shows a communications display interface of a communications terminal a. A quantity of online characters in a character layer may be displayed on the top of the communications display interface, for example, there are 356 persons online. By using an example in which a character a is the first character, the communications terminal a controls the first character to move. The character layer includes multiple characters, and each user controls a character. FIG. 2-a shows three characters included in the character layer. The character a is controlled by a user a by operating the communications terminal a, a character b is controlled by a user b by operating a communications terminal b, and a character c is controlled by a user c by operating a communications terminal c. In FIG. 2-a, the character a is represented by using a black circle, and other characters are represented by using white circles. The character a stays at a particular location on the communications display interface, and in this case, the character b and the character c are displayed on the communications display interface of the communications terminal a. When the user a operates the communications terminal a, after the user a clicks a particular location on the communications display interface of the communications terminal a, the character a is moved in the character layer, and after the character a is moved to the location specified by the user, characters that are in the character layer and that are displayed on the communications display interface of the communications terminal a change. The character b disappears from the communications display interface because the character a is moved rightward, the character c is still displayed on the communications display interface, and a character d is displayed on the communications display interface because the character a is moved rightward. In FIG. 2-a, before the character a is moved, the user a may select the character b and the character c to chat with. After the character a is moved, the user a may select the character c and the character d to chat with. Therefore, in this embodiment of this application, the user may free to select and change a chat object at any time.

FIG. 2-b is a schematic diagram of an implementation manner of controlling, by a user by using a communications terminal, a first character to communicate according to some embodiments of this application. In the first figure from the left to the right in FIG. 2-b, a user may click a dialog box on a communications display interface of a communications terminal a. In the second figure from the left to the right in FIG. 2-b, a keyboard is popped up, the user a clicks the dialog box, and enters chat content related to a character c: @ character c, the Mid-Autumn Festival is coming. After the communications terminal a obtains the chat content entered by the user a, in the third figure from the left to the right in FIG. 2-b, the communications terminal a displays the chat content on the communications display interface, so that the user c can see the chat content sent by the user a to the user c. As shown in FIG. 2-b, the chat content is displayed in a chat bubble.

FIG. 2-c is a schematic diagram of a relationship between a character a and a character layer according to some embodiments of this application. The character layer has an X axis and a Y axis, and each character has its own location. When a character of a current user is moved to an edge of a screen, the character layer automatically moves, so as to achieve a boundary extension effect. For example, the character layer includes: a character a, a character b, a character c, a character d, a character e, a character f, a character g, a character h, a character i, a character j, a character k, a character l, and a character m. The character a represents a first character. Triangular symbols on the left and right sides of a communications display interface indicate characters existing on the character layer but not existing on the current communications display interface. The user may move the character a according to this instruction, so as to search for a new chat object to chat with.

FIG. 2-d is a schematic diagram of an implementation manner of moving a character a on a character layer according to some embodiments of this application. Each character on a character layer has a fixed coordinate location (may be represented by using values of X and Y) on the character layer. Movement of each character may be considered as a change of the coordination location of the character, so that coordinate locations of characters change, and distances between the characters also change. As a result, a character disappears from a communications display interface, and a character is displayed on the communications display interface. As shown in FIG. 2-d, before the character a is moved, the character a, a character b, and a character c are displayed on the communications display interface, so that the user a may select the character b and the character c to chat with. After the character a is moved, a character d, a character e, a character f, a character g, a character h, and a character are displayed on the communications display interface, the user a may select the character d, the character e, the character f, the character g, the character h, and the character i to chat with.

FIG. 2-e is a schematic diagram of an implementation manner of a background layer and a character layer according to some embodiments of this application. The background layer is used to display a background image, and the character layer is used to display a character of a current user and a character of another user. When the user clicks, the character layer responds, so that a displacement effect occurs.

It should be noted that, for ease of description, the foregoing method embodiments are described as a series of action combination. However, persons of ordinary skill in the art should know that this application is not limited to the order of the described actions, because according to this application, some operations may be performed in other orders or performed simultaneously. Secondarily, persons skilled in the art should also know that the embodiments described in the specification all belong to preferred embodiments and the involved actions and modules are not necessary for this application.

In sum, the present application is directed to a first communications control method performed at a first communications terminal that is one of a group of communications terminals communicatively coupled to one another in support of a group chat among users of the group of communications terminals. Initially, the first communications control displays the graphical user interface corresponding to the group chat, the graphical user interface including a first set of characters, each character representing a user of a respective communications terminal. For example, FIGS. 2-a to 2-d depict screenshots taken from the graphical user interface of the group chat on the first communications control. In some embodiments, a character's initial location in the graphical user interface is dependent, at least in part, upon location information of a communications terminal corresponding to the character. For example, it is possible to track down the location of each communications terminal based on its built-in GPS module. The location information is used for representing the relative locations between different characters corresponding to different communications terminals. Note that the group of communications terminals may be coupled to one another by a remote server hosting the group chat (i.e., in a client-server type network topography) or coupled to one another in a peer-to-peer network topography.

Upon detecting a first message from a user of the first communications terminal through the graphical user interface, the first communications terminal transmits the first message to a first subset of the group of communications terminals corresponding to the first set of characters (see, e.g., Role b and Role c in FIG. 2-a).

Then the first communications terminal detects a user instruction to update the graphical user interface. In some embodiments, the user instruction to update the graphical user interface is one or more of zooming into the graphical user interface to cause a character in the first set of characters to disappear from the graphical user interface, zooming out of the graphical user interface to cause a character not in the first set of characters to appear in the graphical user interface, and moving the first character from its current position to a new position in the graphical user interface to cause a character in the first set of characters to disappear from the graphical user interface or a character not in the first set of characters to appear in the graphical user interface. In response, the first communications terminal replacing the first set of characters with a second set of characters, wherein there is at least one difference between the first set of characters and the second set of characters. For example, FIG. 2-a depicts that, when Role a is moved towards the right side of the graphical user interface, Role b disappears from the graphical user interface and Role d appears in the graphical user interface. In other words, the difference between the first set of characters and the second set of characters includes one or more of that the first set of characters includes at least one character not in the second set of characters and the second set of characters includes at least one character not in the first set of characters.

Next, the first communications terminal detects a second message from the user of the first communications terminal through the graphical user interface and transmits the second message to a second subset of the group of communications terminals corresponding to the second set of characters. In some embodiments, the first communications terminal displays a dynamic visual indicator associated with each of the second set of characters in the graphical user interface, the dynamic visual indicator representing the transmission of the second message to a communications terminal corresponding to the corresponding character. For example, a dynamic arrow line is drawn from the first character to each of the second set of characters to represent the origin and destination of each message flowing between different characters in the graphical user interface.

In some embodiments, a set of characters that are going to receive a message is finalized when the user of the first communications terminal starts composing the message. As such, any other character added to the graphical user interface after the user has started composing the message is not going to receive the message. Similarly, any character removed from the graphical user interface after the user has started composing the message will still receive the message.

In some other embodiments, a set of characters that are going to receive a message is finalized when the user of the first communications terminal starts sending the message by pressing a button on the first communications terminal. As such, any character added to the graphical user interface before the user starts sending the message is going to receive the message and any character removed from the graphical user interface before the user starts sending the message is not going to receive the message.

In some embodiments, the first communications terminal detects a third message and a user-selected character among the second set of characters from the user of the first communications terminal through the graphical user interface and then transmits the third message to a communications terminal corresponding to the user-selected character among the second set of characters. In other words, the user of the first communications terminal is able to send a message to a specific character currently appearing in the graphical user interface by specifically including the user account identifier corresponding to the specific character in the graphical user interface.

In some embodiments, the first communications terminal receives a fourth message from a user of a communications terminal corresponding to a character not currently in the graphical user interface. When this happens, the first communications terminal may update the graphical user interface (e.g., zoom out of the graphical user interface or shift the graphical user interface) to include the character associated with the fourth message and display the fourth message adjacent the character in the graphical user interface in a manner to highlight that it is responsible for sending the fourth message. By doing so, the user of the first communications terminal can always tell from which character a new message comes and its location relative to the other characters in the graphical user interface.

For the convenience of a better implementation of the foregoing solutions of the embodiments of this application, the following further provides related apparatuses configured to implement the foregoing solutions.

Referring to FIG. 3, an embodiment of this application provides a communications terminal 300. The communications terminal 300 may include: a character control module 301, an obtaining module 302, and a display module 303.

The character control module 301 is configured to control a first character to move on a character layer, and different characters on the character layer are displayed on a communications display interface of the communications terminal with the movement of the first character, the first character being displayed on the communications display interface of the communications terminal, the character layer including: the first character and at least one character other than the first character, and the first character being a user object that represents a user when the user chats using the communications terminal.

The obtaining module 302 is configured to obtain chat content entered by the user into the communications terminal.

The display module 303 is configured to display the chat content on the communications display interface as an identity of the first character.

In some embodiments of this application, the obtaining module 302 is further configured to: after the character control module controls the first character to move on the character layer, obtain, when the first character stays on the communications display interface after being stopped moving, the first character, and multiple characters other than the first character on the character layer that are displayed on the communications display interface.

The display module 303 is further configured to display the first character, and the multiple characters other than the first character on the character layer to the user by using the communications display interface.

In some embodiments of this application, the obtaining module 302 is specifically configured to: after the character control module displays the first character, and the multiple characters other than the first character to the user by using the communications display interface, obtain a second character selected by the user from the multiple characters other than the first character as a chat object, and obtain chat content that is related to the second character and that is entered by the user into the communications terminal.

In some embodiments of this application, the display module 303 is specifically configured to display the chat content related to the second character on the communications display interface as the identity of the first character.

In some embodiments of this application, the character control module 301 is specifically configured to control the first character to move on the character layer and a background layer, where the first character, and a background image that is on the background layer and that is displayed on the communications display interface are displayed on the communications display interface of the communications terminal.

In some embodiments of this application, the characters included on the character layer and the background image on the background layer have an association relationship.

In some embodiments of this application, the display module 303 is further configured to: after the character control module 301 controls the first character to move on the character layer, display, to the user by using the communications display interface, chat content output by a third character.

The obtaining module 302 is further configured to obtain chat content that is related to the third character and that is entered by the user into the communications terminal.

The display module 303 is further configured to display the chat content related to the third character on the communications display interface as the identity of the first character.

In some embodiments of this application, the character control module 301 is further configured to control the first character to continue to move on the character layer.

The display module 303 is specifically configured to: when the character is being moved, display the chat content on the communications display interface as the identity of the moving first character.

It may be learned from a description that is of the foregoing embodiments and that is for this embodiment of this application, the communications terminal controls a first character to move on a character layer, the first character is displayed on the communications display interface of the communications terminal, and with the movement of the first character, characters that are on the character layer and that are displayed on the communications display interface change. The character layer includes: the first character and at least one character other than the first character, and the first character is a user object that represents a user when the user chats using the communications terminal. The communications terminal obtains chat content entered by the user into the communications terminal, and the communications terminal displays the chat content on the communications display interface as an identity of the first character. In some embodiments of this application, the communications terminal used by the user controls the first character representing the user, and the first character is moved on the character layer under control of the communications terminal, so that with the movement of the first character, the characters that are on the character layer and that are displayed on the communications display interface change. Therefore, as the communications terminal controls the first character to continuously move, different characters are displayed on the communications display interface, and all characters displayed on the communications display interface see the foregoing chat content of the user that is displayed on the communications display interface as the identity of the first character. Therefore, the user may change a chat object by moving the first character at any time, and if after the first character is moved, only the first character and another character are displayed on the communications display interface, the user may implement a point-to-point chat. If after the first character is moved, multiple characters are displayed on the communications display interface, the user may implement a group chat among multiple persons. Therefore, in this embodiment of this application, a change between a point-to-point chat and a group chat among multiple persons may be implemented at any time. In addition, in this embodiment of this application, the user controls, by using the communications terminal, the first character to represent the user to chat. Therefore, the user may set a chat identity of the user by using a character.

An embodiment of this application further provides another communications terminal. As shown in FIG. 4, for ease of description, only parts related to the embodiments of this application are shown. For specific technical details that are not disclosed, refer to the method part in the embodiments of this application. The communications terminal may be any terminal device including a mobile phone, a tablet computer, a personal digital assistant (PDA), a point of sale (POS), or an in-vehicle computer. An example in which the communications terminal is a mobile phone is used:

FIG. 4 is a block diagram of the structure of a part of a mobile phone related to a communications terminal according to some embodiments of this application. Referring to FIG. 4, the mobile phone includes components such as a radio frequency (RF) circuit 410, a memory 420, an input unit 430, a display unit 440, a sensor 450, an audio circuit 460, a wireless (WiFi) module 470, a processor 480, and a power supply 490. Persons skilled in the art may understand that the structure of the mobile phone shown in FIG. 4 does not constitute a limitation to the mobile phone, and the mobile phone may include more components or fewer components than those shown in the figure, or some components may be combined, or a different component deployment may be used.

The following specifically describes the components of the mobile phone with reference to FIG. 4.

The RF circuit 410 may be configured to receive and send signals during an information receiving and sending process or a call process. Particularly, the RF circuit 410 receives downlink information from a base station, then delivers the downlink information to the processor 480 for processing, and sends related uplink data to the base station. Generally, the RF circuit 410 includes, but is not limited to, an antenna, at least one amplifier, a transceiver, a coupler, a low noise amplifier (LNA), and a duplexer. In addition, the RF circuit 410 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 420 may be configured to store a software program and module. The processor 480 runs the software program and module stored in the memory 420, to implement various functional applications and data processing of the mobile phone. The memory 420 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 420 may include a high speed random access memory, and may further include a non-volatile memory such as at least one magnetic disk storage device, a flash memory, or another volatile solid-state storage device.

The input unit 430 may be configured to receive input digit or character information, and generate a keyboard signal input related to the user setting and function control of the mobile phone. Specifically, the input unit 430 may include a touch panel 431 and another input device 432. The touch panel 431, which may also be referred to as a touchscreen, may collect a touch operation of a user on or near the touch panel (such as an operation of a user on or near the touch panel 431 by using any suitable object or accessory such as a finger or a stylus), and drive a corresponding connection apparatus according to a preset program. In some embodiments, the touch panel 431 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 480. Moreover, the touch controller can receive and execute a command sent from the processor 480. In addition, the touch panel 431 may be a resistive, capacitive, infrared, or surface sound wave type touch panel. In addition to the touch panel 431, the input unit 430 may further include the another input device 432. Specifically, the another input device 432 may include, but is not limited to, one or more of a physical keyboard, a functional key (such as a volume control key or a switch key), a track ball, a mouse, and a joystick.

The display unit 440 may be configured to display information input by the user or information provided for the user, and various menus of the mobile phone. The display unit 440 may include a display panel 441. In some embodiments, the display panel 441 may be configured by using a liquid crystal display (LCD), an organic light-emitting diode (OLED), or the like. Further, the touch panel 431 may cover the display panel 441. After detecting a touch operation on or near the touch panel 431, the touch panel 431 transfers the touch operation to the processor 480, so as to determine the type of the touch event. Then, the processor 480 provides a corresponding visual output on the display panel 441 according to the type of the touch event. Although, in FIG. 4, the touch panel 431 and the display panel 441 are used as two separate parts to implement input and output functions of the mobile phone, in some embodiments, the touch panel 431 and the display panel 441 may be integrated to implement the input and output functions of the mobile phone.

The mobile phone may further include at least one sensor 450 such as an optical sensor, a motion sensor, and other sensors. Specifically, the optical sensor may include an ambient light sensor and a proximity sensor. The ambient light sensor may adjust luminance of the display panel 441 according to brightness of the ambient light. The proximity sensor may switch off the display panel 441 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 460, a loudspeaker 461, and a microphone 462 may provide audio interfaces between the user and the mobile phone. The audio circuit 460 may convert received audio data into an electric signal and transmit the electric signal to the loudspeaker 461. The loudspeaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 480 sends the audio data to, for example, another mobile phone by using the RF circuit 410, or outputs the audio data to the memory 420 for further processing.

WiFi belongs to a short-range wireless transmission technology. The mobile phone may help, by using the WiFi module 470, the user to receive and send e-mails, browse a web page, access streaming media, and so on, which provides wireless broadband Internet access for the user. Although FIG. 4 shows the WiFi module 470, it may be understood that the WiFi module 470 is not a necessary component of the mobile phone, and when required, the WiFi module 470 may be omitted as long as the scope of the essence of the present disclosure is not changed.

The processor 480 is the control center of the mobile phone, and is connected to various parts of the mobile phone by using various interfaces and lines. By running or executing the software program and/or module stored in the memory 420, and invoking data stored in the memory 420, the processor 480 performs various functions and data processing of the mobile phone, thereby performing overall monitoring on the mobile phone. In some embodiments, the processor 480 may include one or more processing units. Preferably, the processor 480 may integrate an application processor and a modem. The application processor mainly processes an operating system, a user interface, an application program, and the like. The modem mainly processes wireless communication. It may be understood that the foregoing modem may alternatively not be integrated into the processor 480.

The mobile phone further includes the power supply 490 (such as a battery) for supplying power to the components. Preferably, the power supply may be logically connected to the processor 480 by using a power management system, thereby implementing functions such as charging, discharging and power consumption management by using the power management system.

Although not shown in the figure, the mobile phone may further include a camera, a Bluetooth module, and the like, which are not further described herein.

In some embodiments of this application, the processor 480 included in the communications terminal is further configured to: control and perform the foregoing communications control method process performed by the communications terminal.

Furthermore, it should be noted that the described apparatus embodiments are merely exemplary. The units described as separate parts may or may not be physically separate, and parts displayed as units may or may not be physical units, may be located in one position, or may be distributed on multiple network units. Some or all of the modules may be selected according to an actual requirement to achieve the objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables. Persons of ordinary skill in the art may understand and implement the embodiments of this application without creative efforts.

Based on the description of the foregoing implementation manners, persons skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, for this application, software program implementation is a better implementation manner in most cases. Based on such an understanding, the technical solutions of this application essentially or the part contributing to the existing technology may be implemented in a form of a software product. The software product is stored in a non-transitory computer readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

To sum up, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A communications control method performed at a first communications terminal having one or more processors and memory storing one or more programs to be executed by the one or more processors, wherein the first communications terminal is one of a group of communications terminals communicatively coupled to one another in support of a group chat among users of the group of communications terminals, the method comprising:
   displaying a graphical user interface corresponding to the group chat, the graphical user interface including a first set of characters, each character representing a user of a respective communications terminal, wherein the first set of characters includes one corresponding to a first user of the first communications terminal and relative physical locations of a first set of communications terminals corresponding to the first set of characters are within a predefined range;
   detecting a first chat message from the first user of the first communications terminal through the graphical user interface;
   in response to the first chat message, transmitting the first chat message to the first subset of the group of communications terminals corresponding to the first set of characters;
   detecting a user instruction to update the graphical user interface;
   in response to the user instruction to update the graphical user interface, replacing the first set of characters with a second set of characters, wherein there is at least one difference between the first set of characters and the second set of characters;
   detecting a second chat message from the first user of the first communications terminal through the graphical user interface;
   in response to the second chat message, transmitting the second chat message to a second subset of the group of communications terminals corresponding to the second set of characters;
   receiving, by the first communication terminal, a third chat message from a second user of a second communications terminal corresponding to a second character not currently displayed in the graphical user interface, wherein the second user is a member of the group chat and the second communications terminal is not within the predefine range of the first set of communications terminals; and
   in response to receiving the third chat message,
      zooming out the graphical user interface until after the second character appears in the graphical user interface;
      displaying the third chat message adjacent the second character in the graphical user interface; and
      highlighting the second character on the graphical user interface in a visually distinguishable manner different from the first set of characters in accordance with a current physical location of the second communications terminal.

2. The method according to claim 1, wherein the graphical user interface includes a first character representing the first user of the first communications terminal.

3. The method according to claim 2, wherein the user instruction to update the graphical user interface is one or more of zooming into the graphical user interface to cause a character in the first set of characters to disappear from the graphical user interface, zooming out of the graphical user interface to cause a character not in the first set of characters to appear in the graphical user interface, and moving the first character from its current position to a new position in the graphical user interface to cause a character in the first set of characters to disappear from the graphical user interface or a character not in the first set of characters to appear in the graphical user interface.

4. The method according to claim 2, further comprising:
detecting a movement of the first character representing the first user in the graphical user interface along a first direction to an edge of a display of the first communications terminal;
in response to detecting the movement, determining whether one or more characters exist outside the currently displayed graphical user interface along the first direction;
in accordance with determining that one or more characters exist outside the currently displayed graphical user interface along the first direction, automatically shifting the graphical user interface in accordance with the movement of the first character toward the first direction.

5. The method according to claim 1, wherein the at least one difference between the first set of characters and the second set of characters includes one or more of that the first set of characters includes at least one character not in the second set of characters and the second set of characters includes at least one character not in the first set of characters.

6. The method according to claim 1, further comprising:
detecting a fourth chat message and a user-selected character among the second set of characters from the first user of the first communications terminal through the graphical user interface; and
in response to the fourth chat message, transmitting the fourth chat message to a communications terminal corresponding to the user-selected character among the second set of characters.

7. The method according to claim 1, wherein the operation of transmitting the second chat message to a second subset of the group of communications terminals corresponding to the second set of characters further includes:
displaying a dynamic visual indicator associated with each of the second set of characters in the graphical user interface, the dynamic visual indicator representing the transmission of the second chat message to a communications terminal corresponding to the corresponding character.

8. The method according to claim 1, wherein a character's initial location in the graphical user interface is dependent, at least in part, upon location information of a communications terminal corresponding to the character.

9. The method according to claim 1, wherein the group of communications terminals are communicatively coupled to one another via a remote server hosting the group chat.

10. A first communications terminal, wherein the first communications terminal is one of a group of communications terminals communicatively coupled to one another in support of a group chat among users of the group of communications terminals, the first communications terminal comprising: one or more processors; memory and one or more programs stored in the memory that, when executed by the one or more processors, cause the first communications terminal to perform a plurality of operations including:
displaying a graphical user interface corresponding to the group chat, the graphical user interface including a first set of characters, each character representing a user of a respective communications terminal, wherein the first set of characters includes one corresponding to a first user of the first communications terminal and relative physical locations of a first set of communications terminals corresponding to the first set of characters are within a predefined range;
detecting a first chat message from the first user of the first communications terminal through the graphical user interface;
in response to the first chat message, transmitting the first chat message to the first subset of the group of communications terminals corresponding to the first set of characters;
detecting a user instruction to update the graphical user interface;
in response to the user instruction to update the graphical user interface, replacing the first set of characters with a second set of characters, wherein there is at least one difference between the first set of characters and the second set of characters;
detecting a second chat message from the first user of the first communications terminal through the graphical user interface;
in response to the second chat message, transmitting the second chat message to a second subset of the group of communications terminals corresponding to the second set of characters;
receiving, by the first communication terminal, a third chat message from a second user of a second communications terminal corresponding to a second character not currently displayed in the graphical user interface, wherein the second user is a member of the group chat and the second communications terminal is not within the predefine range of the first set of communications terminals; and
in response to receiving the third chat message,
zooming out the graphical user interface until after the second character appears in the graphical user interface;
displaying the third chat message adjacent the second character in the graphical user interface; and
highlighting the second character on the graphical user interface in a visually distinguishable manner different from the first set of characters in accordance with a current physical location of the second communications terminal.

11. The first communications terminal according to claim 10, wherein the graphical user interface includes the first character representing a user of the first communications terminal.

12. The first communications terminal according to claim 11, wherein the user instruction to update the graphical user interface is one or more of zooming into the graphical user interface to cause a character in the first set of characters to disappear from the graphical user interface, zooming out of the graphical user interface to cause a character not in the first set of characters to appear in the graphical user interface, and moving the first character from its current position to a new position in the graphical user interface to cause a character in the first set of characters to disappear from the graphical user interface or a character not in the first set of characters to appear in the graphical user interface.

13. The first communications terminal according to claim 11, wherein the plurality of operations include:
- detecting a movement of the first character representing the first user in the graphical user interface along a first direction to an edge of a display of the first communications terminal;
- in response to detecting the movement, determining whether one or more characters exist along the first direction and outside the currently displayed graphical user interface;
- in accordance with determining that one or more characters exist along the first direction and outside the currently displayed graphical user interface, automatically shifting the graphical user interface in accordance with the movement of the first character toward the first direction.

14. The first communications terminal according to claim 10, wherein the at least one difference between the first set of characters and the second set of characters includes one or more of that the first set of characters includes at least one character not in the second set of characters and the second set of characters includes at least one character not in the first set of characters.

15. The first communications terminal according to claim 10, wherein the plurality of operations include:
- detecting a fourth chat message and a user-selected character among the second set of characters from the first user of the first communications terminal through the graphical user interface; and
- in response to the fourth chat message, transmitting the fourth chat message to a communications terminal corresponding to the user-selected character among the second set of characters.

16. The first communications terminal according to claim 10, wherein the operation of transmitting the second chat message to a second subset of the group of communications terminals corresponding to the second set of characters further includes:
- displaying a dynamic visual indicator associated with each of the second set of characters in the graphical user interface, the dynamic visual indicator representing the transmission of the second chat message to a communications terminal corresponding to the corresponding character.

17. The first communications terminal according to claim 10, wherein a character's initial location in the graphical user interface is dependent, at least in part, upon location information of a communications terminal corresponding to the character.

18. A non-transitory computer readable storage medium storing one or more computer programs, wherein the one or more computer programs, when executed by one or more processors of a first communications terminal that is one of a group of communications terminals communicatively coupled to one another in support of a group chat among users of the group of communications terminals, cause the first communications terminal to perform a plurality of operations including:
- displaying a graphical user interface corresponding to the group chat, the graphical user interface including a first set of characters, each character representing a user of a respective communications terminal, wherein the first set of characters includes one corresponding to a first user of the first communications terminal and relative physical locations of a first set of communications terminals corresponding to the first set of characters are within a predefined range;
- detecting a first chat message from the first user of the first communications terminal through the graphical user interface;
- in response to the first chat message, transmitting the first chat message to the first subset of the group of communications terminals corresponding to the first set of characters;
- detecting a user instruction to update the graphical user interface;
- in response to the user instruction to update the graphical user interface, replacing the first set of characters with a second set of characters, wherein there is at least one difference between the first set of characters and the second set of characters;
- detecting a second chat message from the first user of the first communications terminal through the graphical user interface;
- in response to the second chat message, transmitting the second chat message to a second subset of the group of communications terminals corresponding to the second set of characters;
- receiving, by the first communication terminal, a third chat message from a second user of a second communications terminal corresponding to a second character not currently displayed in the graphical user interface, wherein the second user is a member of the group chat and the second communications terminal is not within the predefine range of the first set of communications terminals; and
- in response to receiving the third chat message,
  - zooming out the graphical user interface until after the second character appears in the graphical user interface;
  - displaying the third chat message adjacent the second character in the graphical user interface; and
  - highlighting the second character on the graphical user interface in a visually distinguishable manner different from the first set of characters in accordance with a current physical location of the second communications terminal.

19. The non-transitory computer readable storage medium according to claim 18, wherein the graphical user interface includes the first character representing a user of the first communications terminal.

20. The non-transitory computer readable storage medium according to claim 19, wherein the user instruction to update the graphical user interface is one or more of zooming into the graphical user interface to cause a character in the first set of characters to disappear from the graphical user interface, zooming out of the graphical user interface to cause a character not in the first set of characters to appear in the graphical user interface, and moving the first character from its current position to a new position in the graphical user interface to cause a character in the first set of characters to disappear from the graphical user interface or a character not in the first set of characters to appear in the graphical user interface.

* * * * *